(12) United States Patent
Kucmerowski et al.

(10) Patent No.: US 6,724,877 B1
(45) Date of Patent: Apr. 20, 2004

(54) USER SPECIFIED HOLD RECALL TREATMENT

(75) Inventors: Dennis L. Kucmerowski, Delray Beach, FL (US); David A. Vander Meiden, Boca Raton, FL (US); Richard Frank, Coral Springs, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/330,280

(22) Filed: Jun. 11, 1999

(51) Int. Cl.[7] .......................... H04M 3/42; H04M 3/00; H04M 5/00
(52) U.S. Cl. .............................. 379/215.01; 379/266.03
(58) Field of Search ................. 379/201.01, 211.01, 379/211.02, 214.01, 215.01, 265.01, 265.02, 265.11, 266.03, 266.06

(56) References Cited

U.S. PATENT DOCUMENTS

| | | | | |
|---|---|---|---|---|
| 5,327,490 A | * | 7/1994 | Cave | 379/216 |
| RE34,735 E | | 9/1994 | Tsaul Kuabe T, et al. | 379/67 |
| 5,657,372 A | | 8/1997 | Ahlberg et al. | 455/414 |
| 5,754,627 A | | 5/1998 | Butler et al. | 379/63 |
| 5,867,572 A | * | 2/1999 | MacDonald et al. | 397/266 |
| 5,970,134 A | * | 10/1999 | Highland et al. | 379/265.02 |
| 5,987,109 A | * | 11/1999 | Hara | 379/165 |
| 6,049,603 A | * | 4/2000 | Schwartz et al. | 379/309 |
| 6,208,658 B1 | * | 3/2001 | Pickett | 370/401 |

* cited by examiner

Primary Examiner—Benny Tieu

(57) ABSTRACT

A telecommunications server (12) includes a timed recall request unit (202) coupled to a timer (200). The timed recall request unit (202) interfaces to the call park service (100) and/or the call hold service (101). When a request for a call park or call hold is made, the user is given the option of electing timed recall or no recall. If a timed recall is desired, the timed recall request unit (202) is accessed to permit the user to either accept a default length of time or to input a desired length of time. If the user manually retrieves the held or parked call prior to expiration of the timer, the timer (200) is reset.

21 Claims, 7 Drawing Sheets

Party A Talking to Party B

Basic Signaling

Party B on far-end hold

USER SPECIFIED HOLD RECALL TREATMENT

BACKGROUND OF THE INVENTION

1. Field of the Invention

The present invention relates to telecommunications systems, and in particular, to supplemental services provided within a telecommunications system.

2. Description of the Related Art

Supplemental services to enhance calling convenience within telecommunications systems are well known. For example, call hold and call parking are services often used. Known call parking services provide the ability to park, i.e., place on hold, a call at a particular park destination. This is accomplished, generally, by the party who is parking the call dialing an access code or depressing a park key, followed by the local number of the park destination. The parked call may then be retrieved locally by the answering party by dialing an access code or depressing a park answer key followed by the local number of the park destination at which the call is parked. Call hold is similar, although the call is placed on hold at the local extension.

Both call park and call hold services are normally provided with individual pre-set timers to allow timed recall of the call to the party that placed the call on hold or to another extension. Often, however, the user does not wish for an automatic timed recall of the parked or held calls. Similarly, the user may wish for a timed recall of parked or held calls, but at a later time than that set for either the park or hold timers. In current telecommunications systems that provide the timed recall function, neither is an option.

SUMMARY OF THE INVENTION

These and other drawbacks in the prior art are overcome in large part by a user specified hold recall treatment according to the present invention. A user specified hold recall system replaces the dual timers of the prior art. The user is able to specify whether to allow timed recall of call hold and call park services, and to specify the duration of the call park or call hold. In addition, the user may elect not to allow timed recall at all.

A telecommunications server according to an embodiment of the invention includes a timed recall request unit coupled to a timer. The timed recall request unit interfaces to the call park service and/or the call hold service. When a request for a call park or call hold is made, the user is given the option of electing timed recall. If a timed recall is desired, the timed recall request unit is accessed to permit the user to either accept a default length of time or to input a desired length of time. If the user manually retrieves the held or parked call prior to expiration of the timer, the timer is reset.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
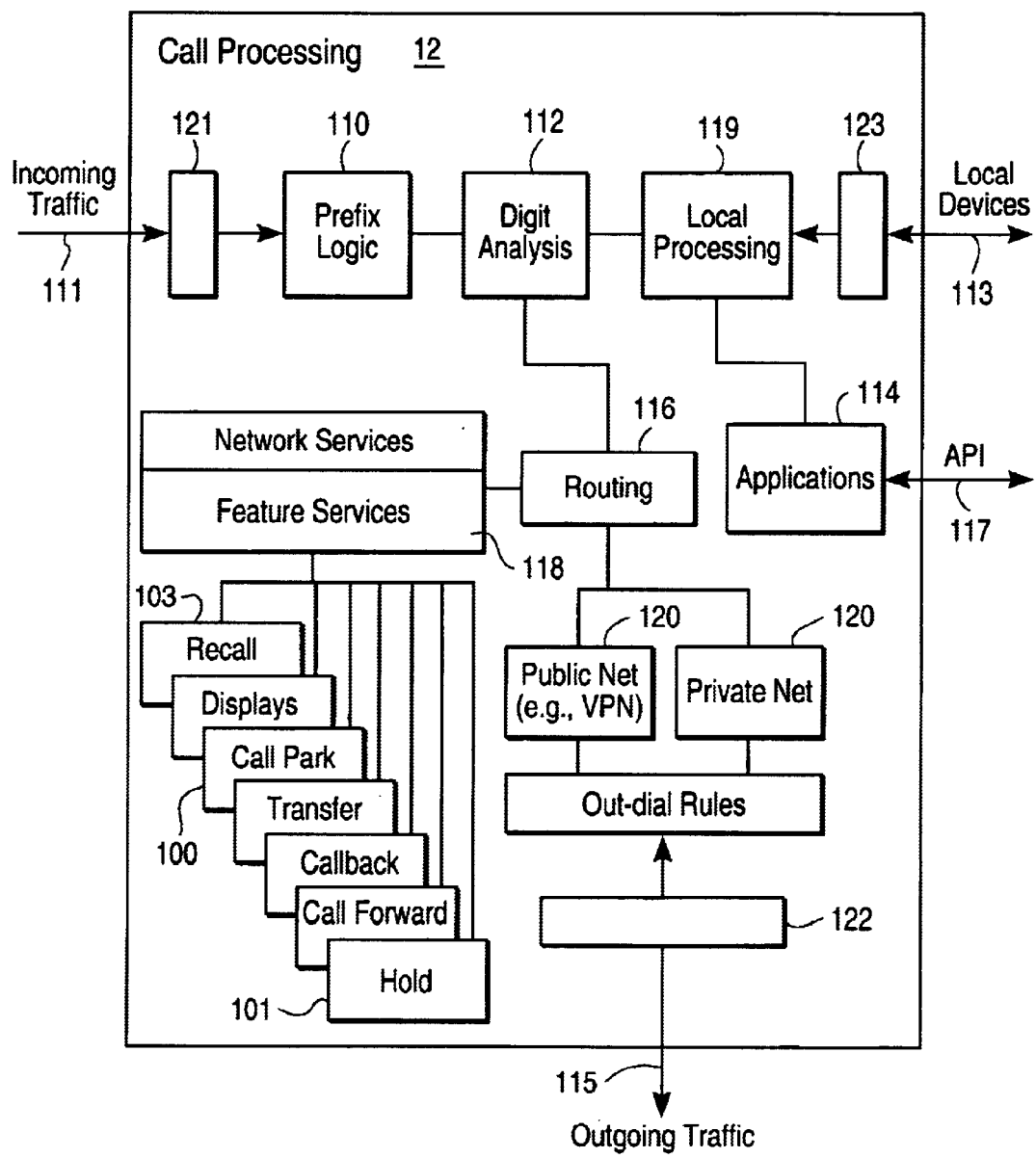
FIG. 1 is a diagram illustrating a telecommunications server according to an embodiment of the invention.

Referring to FIG. 1, an exemplary embodiment of a user specified hold recall service for an ISDN architecture in accordance with the present invention is generally identified with the reference 103. More particularly, the user specified hold recall service 103 is shown implemented, for example, on a communication server 12 as a particular supplementary service in a typical network resource feature processing module 118. As will be discussed in greater detail below, the user is able to specify a duration of call park or call hold, and whether or not any timed recall treatment is to be executed.

The feature processing module 118 may also be used to handle other supplementary services, such as call park 100 and call hold 101. The communication server 12, which may be any known communications server, such as described in U.S. Pat. No. 5,247,670 and hereby incorporated by reference, may include internal standard components, such as prefix logic 110 and digit analysis 112 for receiving, decoding and evaluating number information; applications logic 114 such as CTI; a local processing unit 119 for providing user interface aspects of the user specified hold recall service; and a routing unit 116 for routing a call to its proper destination.

External interfaces to the communication server may include an incoming trunk 111, such as a primary rate interface (PRI) or Internet line, incoming local traffic 113, such as basic rate interface (BRI) and outgoing traffic 115, such as interfaces for public, virtual public (VPN) and private networks, etc.

An API 117 may be used to connect CTI devices (e.g., using TAPI) to the server 12. The outgoing traffic may be routed, among other methods, over asynchronous transfer mode (ATM) or Intra/Internet communication networks. The local processing unit 119 is used to handle call park services within the local server 12, as is done in currently known services.

The incoming/outgoing traffic lines, such as the BRI 113 and PRI 111, interface to device/trunk handlers 121, 122, 123. The device/trunk handlers 121, 122, 123 interface the server 12 with the external interface 111, 113, 115 which contain the signaling channels. In particular, the handlers 121, 122, 123 operate as translation devices and are able to support various protocol types. This is accomplished through either a standard or proprietary message interface between the handlers 121, 122, 123 and the interfaces 111, 113, 115. As referred to herein, BRI and PRI may be used interchangeably since one embodiment of the invention generally uses the D channels and the associated protocols to receive and transmit messages between communications servers.

For illustration only, D channels are used for all signaling and inter-server communications messages. D channel signaling protocols, known as ISDN User-Network Interface, are specified by the International Telecommunication Union (ITU) Q.930/931 specification. Although some form of signaling data may also be carried by the B channels, by using only the D channels for signaling, the B channels generally remain free to carry communications data. It should be noted that the above description is equally applicable to various other types of signaling interfaces.

Figure 2:
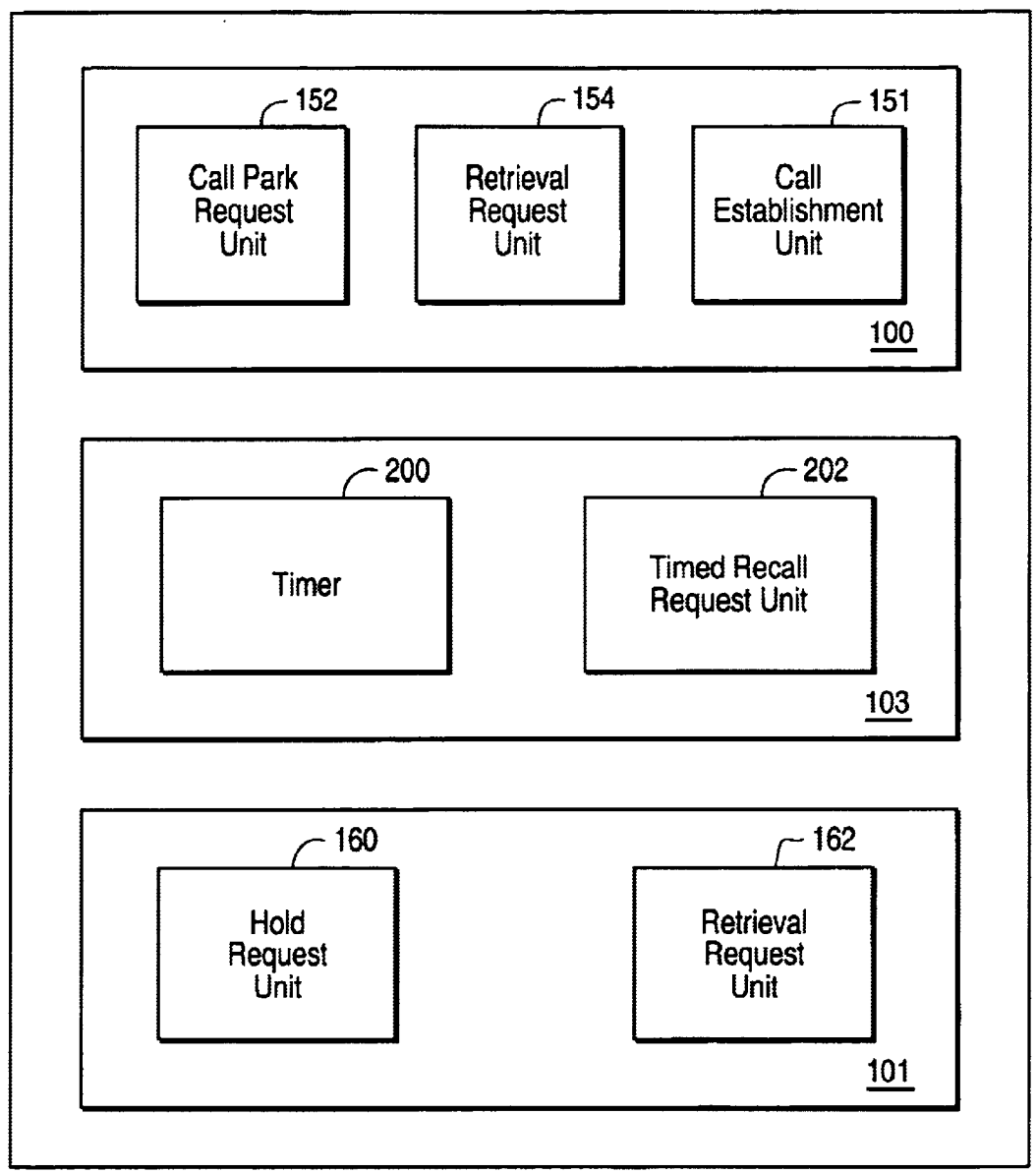
FIG. 2 is a diagram illustrating the call park, call hold, and user specified hold request units of FIG. 1.

Referring to FIG. 2, the user specified hold recall service 103 is shown in greater detail. As mentioned above, the user specified hold recall service 103 is responsible for enabling the user to select hold or park with no recall or with timed recall for variable lengths of time, with the length of time specified by the user. In particular, the user may select the park or hold recall feature (i.e., whether no recall or timed recall is to be used) via a feature button after selecting call hold or call park. Alternatively, the park or hold recall feature option could be presented as a continuation of selecting call hold or call park. For timed recall, the user then enters the length of time the call is to be held. In the event that call park is employed, the user enters the park destination in a standard fashion. Upon expiration of the timer, the call is returned.

The user specified hold recall service 103 as shown includes a timer 200 and a timed recall request unit 202. The call park system 100 includes a call park request unit 152, a retrieval request unit 154, and a call establishment unit 151. Similarly, the hold service 102 includes a hold request unit 160 and a retrieval request unit 162.

The call park request unit 152 requests a call to be parked at the park destination and interfaces to the timed recall request unit 202. The retrieval request unit 154, used in conjunction with the call park request unit 152, connects the answering party with the parked call. The call establishing unit 151 establishes a call to the park destination by the park request unit 152 and retrieval request unit 154.

When a park request is sent, the park request unit 152 becomes active. In the server 12 (FIG. 1), the processing unit 119 processes the input request, the digital analysis unit 112 analyzes the digits and the call park service starts. The user then may select timed recall treatment. If so, then the request is forwarded to the timed recall request unit 202. The timed recall request unit 202 enters the appropriate time into the timer 200. The length of time may be a default time or a user input time, as will be discussed in greater detail below. The call establishing unit 151 then establishes the call at the park destination. The timer 200 then starts; upon expiration of the timer, the retrieval request unit 154 retrieves the call. If the user requests retrieval before expiration of the timer, the timer is stopped and reset, and the call is retrieved.

The handling of hold recalls is similar. The call hold request unit 160 requests a call to be held and interfaces to the timed recall request unit 202. The hold retrieval request unit 162 is used to retrieve the call. When a hold is sent, the hold request unit 160 becomes active. In the server 12 (FIG. 1), the processing unit 119 processes the input request, the digital analysis unit 112 analyzes the digits and the call park service starts. The user then may select timed recall treatment. If so, then the request is forwarded to the timed recall request unit 202. The timed recall request unit 202 enters the appropriate time into the timer 200. The length of time may be a default time or a user input time, as will be discussed in greater detail below. The call is then held, and the timer 200 then starts; upon expiration of the timer, the retrieval request unit 162 retrieves the call. If the user requests retrieval before expiration of the timer, the timer is stopped and reset, and the call is retrieved.

Figure 3:
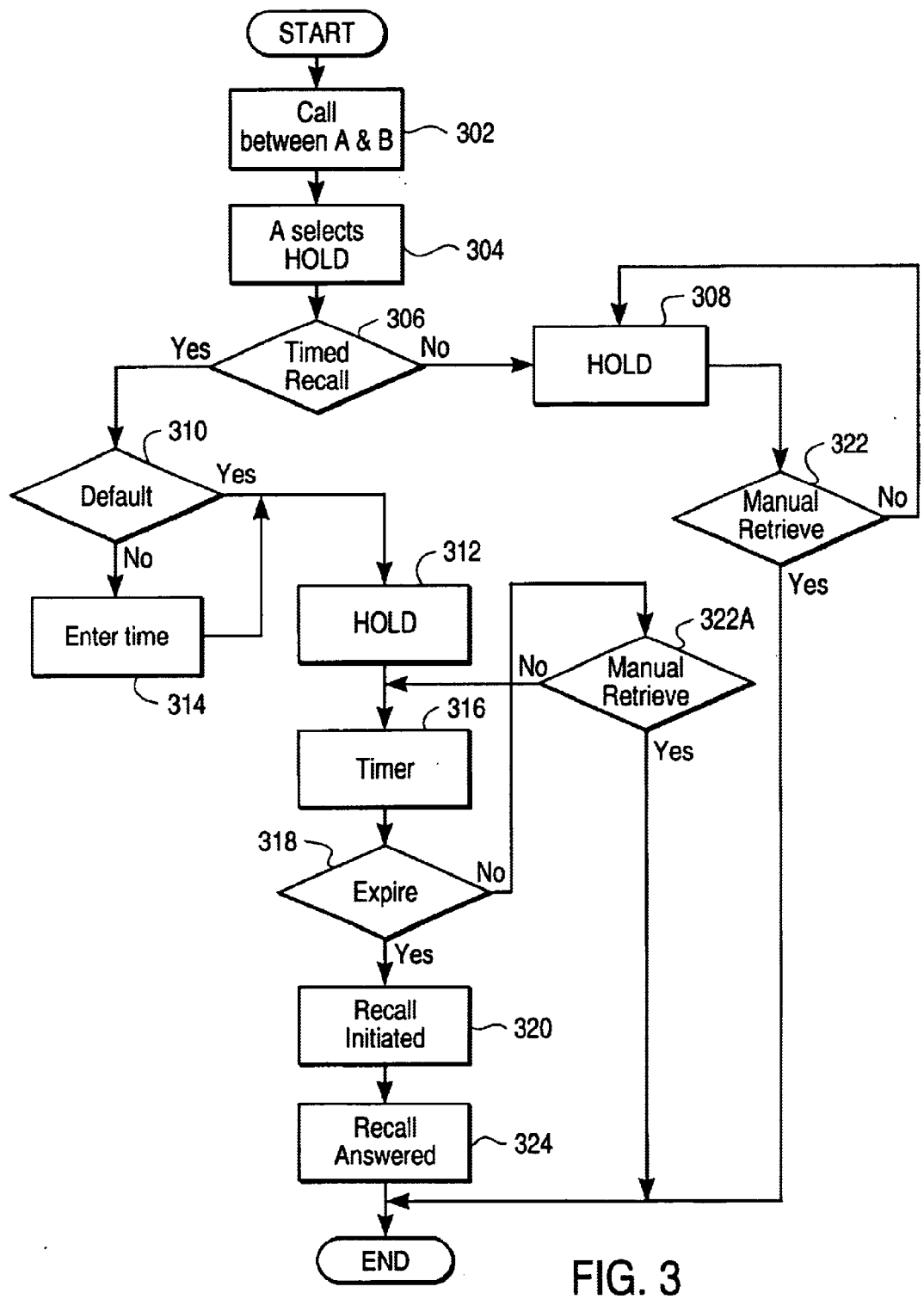
FIG. 3 is a flowchart illustrating user specified hold recall using call hold.

Turning now to FIG. 3, a flowchart 300 illustrating user specified hold recall using call hold services is shown. The flowchart is illustrated by way of an example call between a User A and a User B. In a step 302, User A and User B are connected in a call. In a step 304, User A selects call hold. For example, the User A may depress a function key on his telephone (not shown). This activates the hold request unit 160 (FIG. 2), which interfaces to the timed recall request unit 202. In a step 306, the User A is presented with the option of selecting timed recall. The user A may select timed recall, for example, by depressing a function key, or other known selection mechanism. In a step 310, the timed recall request unit 202 presents the user with the option of selecting a user-specified time for hold recall, or whether a default time should be used instead. If a user specified time is to be used, then in a step 314, the User A is presented by the timed recall request unit 202 with the opportunity to input the specified time. Otherwise, in a step 312, the User B is put on hold in a known manner. Any known user interface may be employed, such as keypad and interactive voice response, keypad with visual display, or computer graphical user interface (GUI) entry.

Once the User A has entered the time, then in a step 312, the User B is put on hold and in a step 316, the timer 200 receives the specified time from the timed recall request unit 202 and begins its countdown. In a step 318, the timer 200 may expire. If not, the system waits for the timer to continue in step 316. However, if the timer expires, then in a step 320, hold is ended by way of a signal to the hold retrieve request unit 162, and User B is reconnected when User A answers the recall in step 324. Even if the timer 200 does not expire, the User A may end hold by doing so manually, in a step 322A. In particular, the User A may select a function key, the input to which is received by the hold retrieve request unit 162 to end the call hold. If, in step 306, the User A had not selected timed recall, then in step 308, the User B would be put on hold, until in step 322, the User A manually ends hold.

Figure 4:
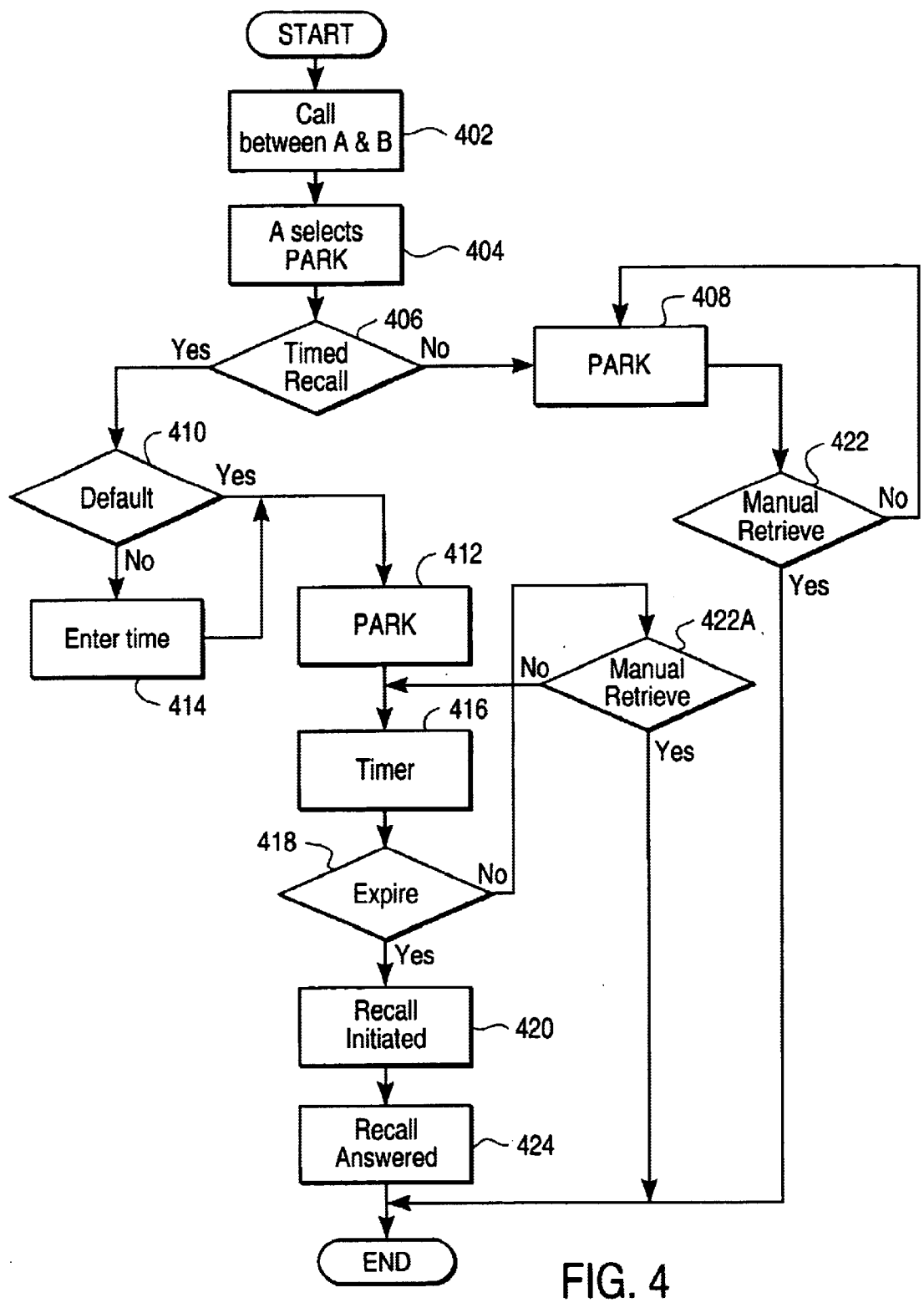
FIG. 4 is a flowchart illustrating user specified hold recall using call park.

Turning now to FIG. 4, a flowchart 400 illustrating user specified hold recall using call park services is shown. The flowchart is illustrated by way of an example call between a User A and a User B. In a step 402, User A and User B are connected in a call. In a step 404, User A selects call park. For example, the User A may depress a function key on his telephone (not shown). This activates the call park request unit 152 (FIG. 2), which interfaces to the timed recall request unit 202. In a step 406, the User A is presented with the option of selecting timed recall. The User A may select timed recall, for example, by depressing a function key, or other known selection mechanism. In a step 410, the timed recall request unit 202 presents the user with the option of selecting a user-specified time for hold recall, or whether a default time should be used instead. If a user specified time is to be used, then in a step 414, the User A is presented by the timed recall request unit 202 with the opportunity to input the specified time. Otherwise, in a step 412, the call is parked in a known manner. Any known user interface may be employed, such as keypad and interactive voice response, keypad with visual display, or computer graphical user interface entry. For example, the User A is given the option to enter the parked to destination, as is known, and the call establishment unit 159 makes the call to the park destination. Once the User A has entered the time, then in a step 412, the User B is put on hold and in a step 416, the timer 200 receives the specified time from the timed recall request unit 202 and begins its countdown. In a step 418, the timer 200 may expire. If not, the system waits for the timer to continue in step 416. However, if the timer expires, then in a step 420, the call is retrieved by way of a signal to the call park retrieve request unit 154 and User B is reconnected when User A answers the recall in step 424. Even if the timer 200 does not expire, the User A may end the call park hold by doing so manually, in a step 422A. In particular, the User A may select a function key, the input to which is received by the call park retrieve request unit 154 to end the call park hold. If, in step 406, the User A had not selected timed recall, then in step 408, the User B would be put on call park hold, until in step 422, the User A manually ends the call park hold.

Figure 5A:
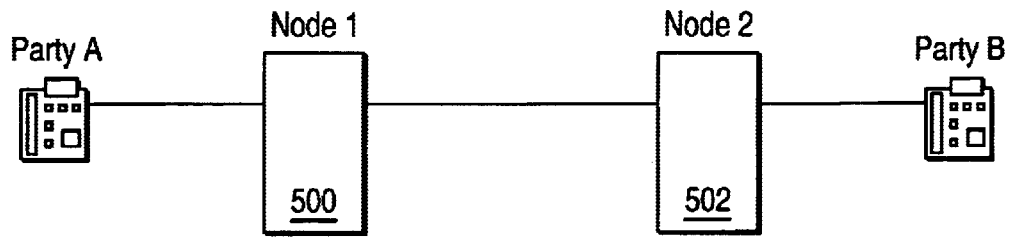
FIGS. 5A–5D is a diagram illustrating signal flow for far end hold recall.
Figure 5B:
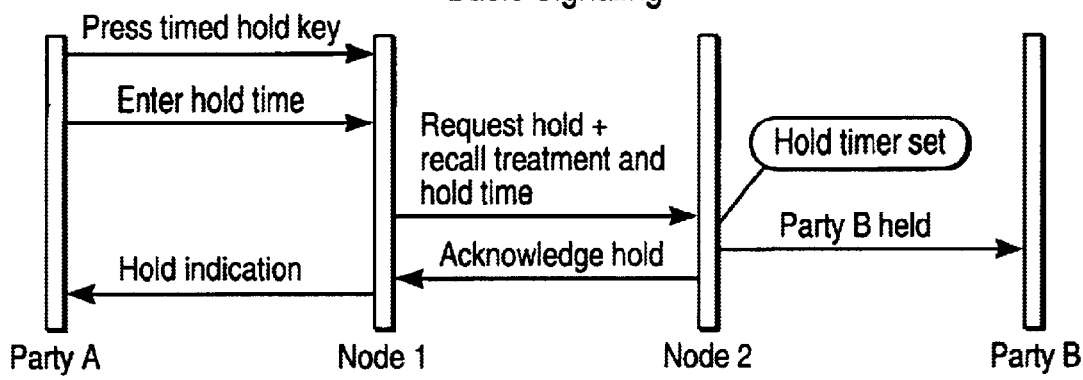

The use of a far end hold recall is illustrated in FIGS. 5A–5D. In particular, the telecommunications system illustrated therein includes a first node or server 500 and a second node or server 502. The nodes 500, 502 are generally similar to the server 12 of FIG. 2. Party A is served by node 500 and Party B is served by the node 502. The basic signaling for the system of FIG. 5A is shown in FIG. 5B. As discussed above, the User A may be communicating with User B. The User A may elect to put User B on hold; selecting the key indicative that timed recall is desired sends a signal to the node 500 to activate the timed hold request unit.

Figure 5C:
Figure 5D:
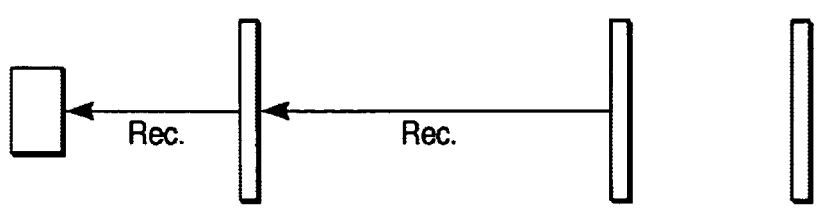

The User A then enters the length of the hold time. The hold request and the recall treatment and hold time are then passed by the hold request unit to the server 502, which is handling Party B. The server 502's hold request unit holds Party B and returns a hold acknowledgement to the server 500. The server 500 then sends a signal to the Party A indicating that the hold was successful. As shown in FIG. 5C, the server 502 (Node 2), and in particular, its timed hold request unit, activates its hold timer to maintain Party B on hold. Upon expiration of the timer, as shown in FIG. 5D, the server 502 recalls Party B to the server 500 and is reconnected to Party A when Party A answers the recall.

Figure 6A:
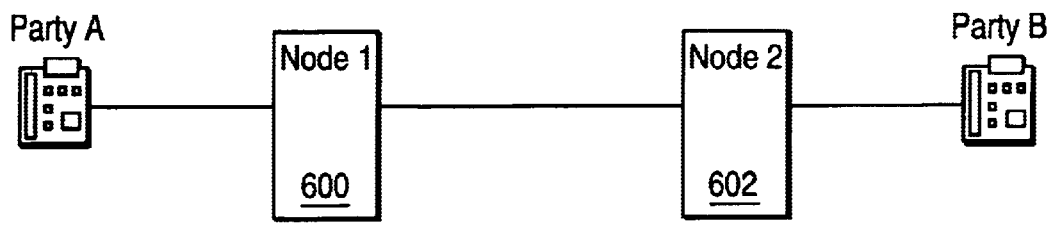
FIGS. 6A–6D is a diagram illustrating signal flow for remote call park.
Figure 6B:
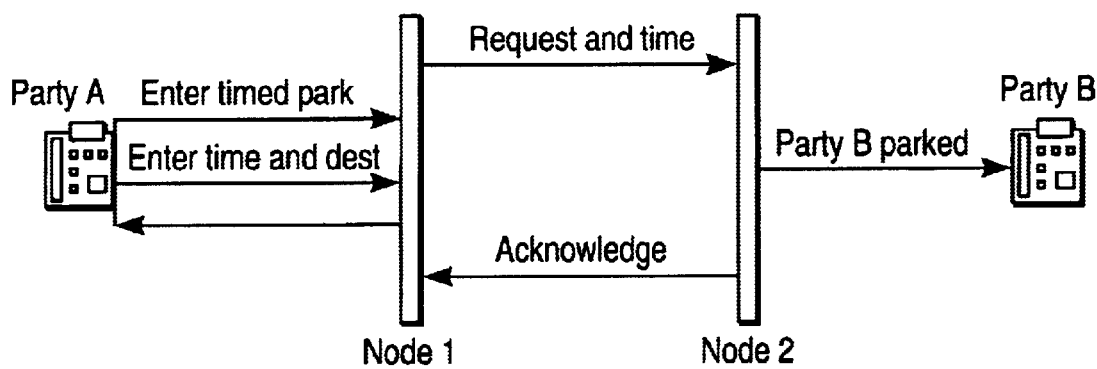

A far end call park hold recall treatment is illustrated in FIGS. 6A–6D. The telecommunications system illustrated therein is similar to that shown in FIG. 5A and includes a first node or server 600 and a second node or server 602. The nodes 600, 602 are generally similar to the server 12 of FIG. 2. Party A is served by node 600 and Party B is served by the node 602. The basic signaling for the system of FIG. 6A is shown in FIG. 6B. As discussed above, the User A may be communicating with User B. The User A may elect to park User B; selecting the key indicative that timed recall is desired sends a signal to the node 600 to activate the timed hold request unit and the call park request unit. The User A then enters the length of the call park hold time. In addition, the User A enters the extension of the call park destination. The call park hold request and the recall treatment and hold time are then passed to the server 602, which is handling Party B. The server 602's call park request unit and its timed hold request unit park Party B and returns a hold acknowledgement to the server 600. The server 600 then sends a signal to the Party A indicating that the call park hold was successful. The Server 600 handles call setup and handshaking needed with the park destination user.

Figure 6C:
Figure 6D:
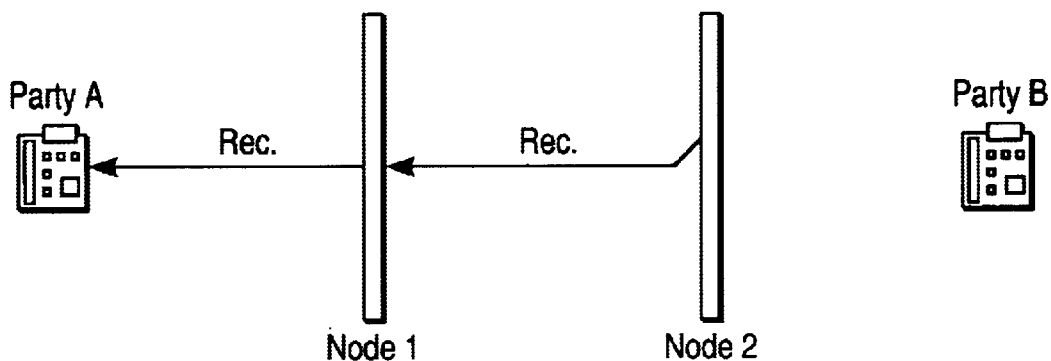

As shown in FIG. 6C, the server 602 (Node 2)'s timed hold request unit activates its hold timer to maintain Party B on hold. Upon expiration of the timer, as shown in FIG. 6D, the server 602 recalls Party B to the server 600 and is reconnected to the party at the park destination when that party answers the recall.

Figure 7:
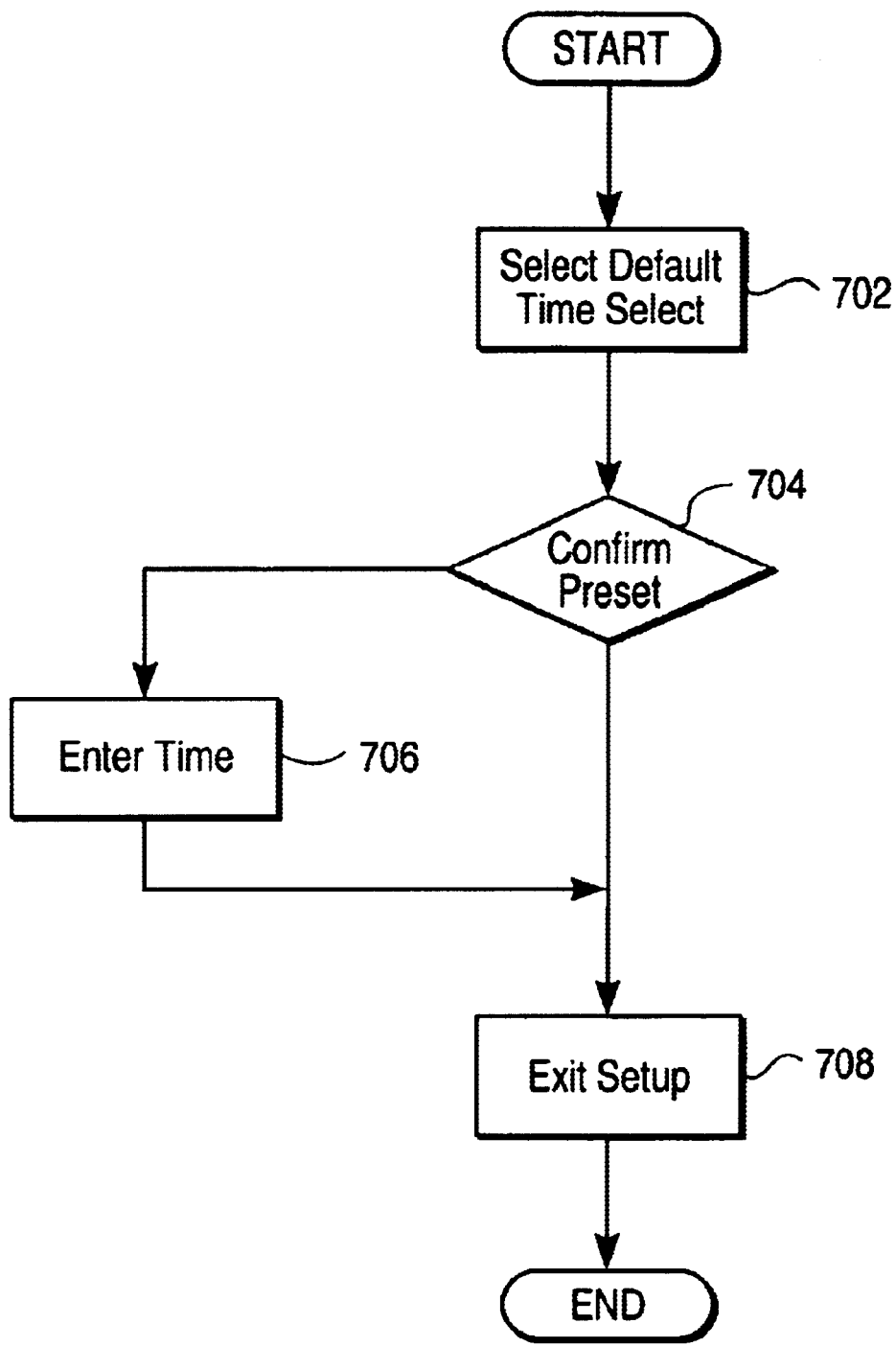
FIG. 7 is a flowchart illustrating setting a default hold time according to an embodiment of the invention.

As noted above, the present invention permits use of a default timer, rather than call-by-call time setting. The duration of the default time may be predetermined or may be preset by the user. Turning now to FIG. 7, a flowchart illustrating set up of the default timer is shown. As shown, in a step 702, a user may select the default time set function, for example, by pressing a function key to enter a setup mode. The timed hold request unit then permits the user the option of merely confirming the preset default time, in a step 704. If the user, however, wishes to change the default time, in a step 706, he is prompted to enter the time. Once the default time has been entered and stored by the timed hold request unit in memory (not shown), the user may exit the set up mode immediately upon confirming the preset default time or by pressing a function key, in a step 708.

What is claimed is:

1. A telecommunications server, comprising:
   first means for holding calls;
   user-specified means for receiving from any of a plurality of parties to a call a length of time during which said calls are to be held.

2. A telecommunications server in accordance with claim 1, further including second means for holding calls, said second means including means for parking calls.

3. A telecommunications server in accordance with claim 2, said entering means including means for entering a parking duration.

4. A telecommunications server in accordance with claim 3, wherein said entering means includes means for entering a default duration for said parking duration and said hold duration.

5. A telecommunications server in accordance with claim 4, wherein said parking duration entering means comprises means for entering a length of said duration during a call.

6. A telecommunications server in accordance with claim 5, wherein a length of time set in said timed recall request unit is user specified at a time of call.

7. A telecommunications server, comprising:
   a call park control unit for parking calls;
   a call hold control unit for holding calls; and
   a timed recall unit for recalling parked calls and held calls based on a user input duration of parking or holding, said user input being received from a telephone device of first or second parties to a call.

8. A telecommunications server in accordance with claim 7, said input duration comprising an input duration having a variable length amount input during a course of a call.

9. A method for operating a telecommunications service between at least first and second users, comprising:
   selecting, on a first or second user telephone, a function for holding calls, an input associated with said selecting being received at a telecommunications server; and
   selecting on said first or second user telephone a duration of time that said calls are to be held, said selecting a duration comprising a user selecting said duration when a call is held, an input associated with said selecting a duration being received at said telecommunications server.

10. A method in accordance with claim 9, said selecting a function including selecting whether default duration is to be chosen or whether a user input duration is to be input.

11. A method in accordance with claim 10, said selecting a function comprising selecting a call hold function.

12. A method in accordance with claim 10, said selecting a function comprising selecting a call park function.

13. A method in accordance with claim 9, said selecting a duration comprising selecting a duration length during a call.

14. A telecommunications server, comprising:
   a call hold unit including a hold request unit for receiving requests from a plurality of parties to a call for a call hold function and a retrieval request unit for receiving requests to retrieve held calls;

a call park unit including a call park request unit for receiving from a plurality of parties to a call requests to park calls, a call establishment unit for connecting a parked call to a park destination, and a call park retrieval request unit for receiving requests to retrieve parked calls; and a user specified hold recall unit, including a timer for timing a held or parked call and a timed recall request unit for setting a length of time a call is parked or held;

wherein said requests and said length of time are adapted to be received from a telephone device of at least one of said plurality of parties to a call being handled via said telecommunications server.

15. A telecommunications server according to claim 14, said retrieval request unit configured to retrieve a held call manually.

16. A telecommunications server according to claim 14, said call park retrieval request unit configured to retrieve a parked call manually.

17. A telecommunications server according to claim 14, wherein said timed recall request unit is adapted to be set on a call-by-call basis.

18. A telecommunications server in accordance with claim 17, wherein a length of time set in said timed recall request unit is user specified at a time of call.

19. A telecommunications system, comprising:

a plurality of communication devices; and one or more telecommunications servers, at least one of said one or more telecommunications servers including a timed recall request unit, wherein said timed recall request unit is configured to permit said plurality of communication devices to set a length of time a call with another of said plurality of communication devices is to be held.

20. A telecommunication system according to claim 19, said timed recall request unit configured to permit a user of at least one of said plurality of communication devices to set a length of time a call with another of said plurality of communication devices is to be parked.

21. A telecommunication system according to claim 19, wherein said first user and said second user are on different ones of said at least one of said one or more telecommunications servers.

* * * * *